United States Patent
Chrz et al.

(10) Patent No.: US 7,025,083 B2
(45) Date of Patent: Apr. 11, 2006

(54) QUICK CLOSING SHUT-OFF VALVE

(75) Inventors: Vaclav Chrz, Usti nad Labem (CZ); Gerd Kirchgassner, Decin (CZ); Petr Zaruba, Decin (CZ)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 10/222,263

(22) Filed: Aug. 15, 2002

(65) Prior Publication Data

US 2003/0079781 A1  May 1, 2003

(30) Foreign Application Priority Data

Aug. 16, 2001  (CZ) ................ 2001-2998

(51) Int. Cl.
*F16K 31/12* (2006.01)

(52) U.S. Cl. ............ 137/492; 137/115.13; 137/461; 137/613; 251/63

(58) Field of Classification Search ........... 137/115.13, 137/115.23, 115.26, 71, 461, 492, 509, 613, 137/462; 251/63; 62/50.7
See application file for complete search history.

(56) References Cited

U.S. PATENT DOCUMENTS

| | | | |
|---|---|---|---|
| 333,403 A | 12/1885 | Fitts | |
| 615,812 A * | 12/1898 | Dallett .................. | 137/115.19 |
| 618,903 A * | 2/1899 | Prince ................... | 137/115.23 |
| 784,961 A * | 3/1905 | Parsons ................. | 417/295 |
| 871,260 A * | 11/1907 | Dyer ...................... | 137/489.5 |
| 1,288,578 A | 12/1918 | Hatfield et al. | |
| 1,628,698 A | 5/1927 | Walker | |
| 2,928,410 A | 3/1960 | Del Vecchio | |
| 3,774,628 A | 11/1973 | Norton et al. | |
| 3,776,251 A * | 12/1973 | Trubman ................. | 137/71 |
| 3,904,175 A | 9/1975 | Deschenes | |
| 4,171,004 A | 10/1979 | Cerrato et al. | |
| 4,171,708 A | 10/1979 | Pareja | |
| 4,244,388 A | 1/1981 | Feiss | |
| 5,398,719 A * | 3/1995 | Drossel et al. .......... | 137/489.5 |
| 6,382,235 B1 | 5/2002 | Drube et al. | |

FOREIGN PATENT DOCUMENTS

| | | |
|---|---|---|
| DE | 25 50 558 A1 | 5/1977 |
| DE | 100 11 674 A1 | 6/2001 |
| GB | 2 355 510 A | 4/2001 |

* cited by examiner

*Primary Examiner*—Ramesh Krishnamurthy
(74) *Attorney, Agent, or Firm*—DLA Piper Rudnick Gray Cary US LLP

(57) ABSTRACT

A quick closing shut-off valve includes an inlet, an outlet and a passage there between. A closing element blocks the passage when in the closed position. The closing element is interconnected to a piston via a pull rod. The piston is positioned within a working chamber that communicates with the valve outlet. A safety valve also communicates with the working chamber and is positioned above the piston. As a result, when the pressure within the tank, and thus in the working chamber, reaches a maximum permissible pressure, the safety valve opens and the pressure above the piston decreases. The piston rises as a result and pulls the closing element via the pull rod into the closed position so that the valve is closed.

18 Claims, 2 Drawing Sheets

QUICK CLOSING SHUT-OFF VALVE

REFERENCE TO RELATED APPLICATIONS

This application claims priority to Czech Republic Patent Application Number PV 2001-2998, filed with the Board of Industrial Property of the Czech Republic on Aug. 16, 2001.

TECHNICAL FIELD OF THE INVENTION

The present invention relates generally to the filling of storage tanks with fluids and, more particularly, to a device that prevents over-pressurization of storage tanks while they are being filled with fluids.

BACKGROUND OF THE INVENTION

It is necessary to protect a pressure vessel or storage tank from over-pressurization when filling the pressure vessel with a liquid from a source that is capable of achieving a higher pressure than the maximum permissible pressure of the vessel or storage tank.

Pressure vessels are equipped with pressure relief devices such as relief valves or rupture disks which are activated when the maximum permissible pressure in normal operation is exceeded or when other unfavorable conditions exist. A pressure relief device maintains the pressure in a vessel at the permissible level by discharging fluid from the vessel when the pressure setting of the pressure relief device is exceeded. The liquid source, for example a tank truck that delivers and dispenses liquids, however, may supply an excess amount of fluid at a high pressure such that the relief valves are not capable of protecting the vessel from the excessive pressure.

Liquefied gases, such as liquid nitrogen, oxygen, argon, methane, carbon dioxide and others, are stored and transported at low temperatures. Typically, the liquefied gases are stored and transported in pressure vessels equipped with vacuum or foam insulation and a relief valve or rupture disk pressure relief device. In addition to the issues stated above, the pressure relief devices are unable to relieve the pressure generated in the top of the vessel and relief piping, which is due to vapor produced by evaporation of the liquid as it is delivered to the vessel by a highly powerful pump, when the vessel becomes completely filled with pressurized fluid. Such powerful pumps may be found on some tank trucks. In each of the above instances, it is crucial to avoid exceeding the maximum permissible pressure of the vessel. This may be achieved by closing the filling piping and/or reducing the flow rate of the fluid from the source into the filled pressure vessel. As such, a quick closing shut-off valve is desirable.

Quick closing shut-off valves are installed at the inlet of pressure vessels to protect the pressure vessels against over-pressurization by closing when the pressure in the vessel exceeds a predetermined level. Quick closing shut-off valves are particularly useful with storage tanks for cryogenic liquids due to the high pressure and high flow rate pumps mounted on many cryogenic liquid tank trucks and also due to the expansion of the cryogenic fluids which occurs due to evaporation as they flow to the vessel being filled.

A common type of prior art quick closing shut-off valve, however, is fitted with a compressed spring that is secured with a latch. The latch is released when the pressure in the vessel reaches the maximum level to shut-off the flow of the fluid into the vessel. Re-opening the flow of the fluid into the vessel requires re-compressing the spring and locking the valve in the open position with the latch. This resetting of the valve is time-demanding and requires special tools to compress the spring. In addition, the design of this prior art quick closing shut-off valve is complicated with passive resistances in the releasing mechanism that are not reliable.

German publication DIT 25 50 558 A1, German Patent No. DE 100 11 674 A1 and United Kingdom published patent application number GB 2 355 510 illustrate valves for reducing pressure, shutting off flow and regulating flow, respectively. Each of the valves features a sliding piston or plunger that is housed within a valve body. The valve body includes a liquid inlet and a liquid outlet. The piston or plunger is moved to restrict or eliminate the flow of liquid from the valve inlet to the outlet.

Each of the three valves, however, suffers from disadvantages with regard to use in protecting pressure vessels. More specifically, the valve of German publication DIT 25 50 558 A1 is not suitable for protecting pressure vessels where fast restoration of operating conditions is desirable after relief of pressure from the vessel. The closing of the valve of German Patent No. DE 100 11 674 A1 takes place magnetically when a pressure decrease occurs. Conversely, the liquid flowing to the valve must be at a certain pressure level to open the valve. Such an arrangement is not suitable for protecting pressure vessels against excessive pressure. The valve of United Kingdom published patent application number GB 2 355 510 is complicated and costly. In addition, the valve requires a pressure impulse to open the valve. The creation of such an impulse requires additional equipment capabilities.

Other known automatic shut-off valves have complicated mechanisms for shutting-off fluid flow, usually including springs, balls or other moving parts that are difficult to produce, wear quickly with use and require frequent maintenance.

As a result, the prior art quick closing valves suffer from a number of disadvantages with regard to shutting off the flow of fluid, particularly of liquefied gases, into a pressure vessel.

Accordingly, it is an object of the present invention to provide a quick closing shut-off valve that automatically closes when the pressure in a vessel being filled reaches a predetermined level.

It is another object of the present invention to provide a quick closing shut-off valve that automatically opens when the pressure in a vessel decreases from the predetermined level.

It is still another object of the present invention to provide a quick closing shut-off valve that is economical to manufacture, operate and maintain.

SUMMARY OF THE INVENTION

A device for protecting a tank from over-pressurization while the tank is being filled with a liquid includes a main body with an inlet that leads to an inlet chamber and an outlet that leads to an outlet chamber. The body also includes a valve seat with an opening that defines a passage therein. The passage interconnects the inlet chamber to the outlet chamber. A closing element is movably positioned within the inlet chamber. The closing element may be moved between an open position for allowing the liquid to flow from the inlet to the outlet and a closed position for blocking the flow of the liquid.

A piston is movably positioned within a working chamber of the main body. The working chamber includes an open section and a pressure relief device positioned above the piston. The piston is connected to the closing element by a pull rod that passes through the passage. The working chamber and open section communicate with the outlet chamber and thus are pressurized by pressure increases in the tank. When the pressure within the tank, and thus in the working chamber and open section, reaches a predetermined maximum level, the pressure relief device opens decreasing the pressure above the piston. As a result, the piston moves upwards and pulls the closing element into the closed position so that the valve is closed.

For a more complete understanding of the nature and scope of the invention, reference may now be had to the following detailed description of embodiments thereof taken in conjunction with the appended claims and accompanying drawings.

DETAILED DESCRIPTION

Figure 1:
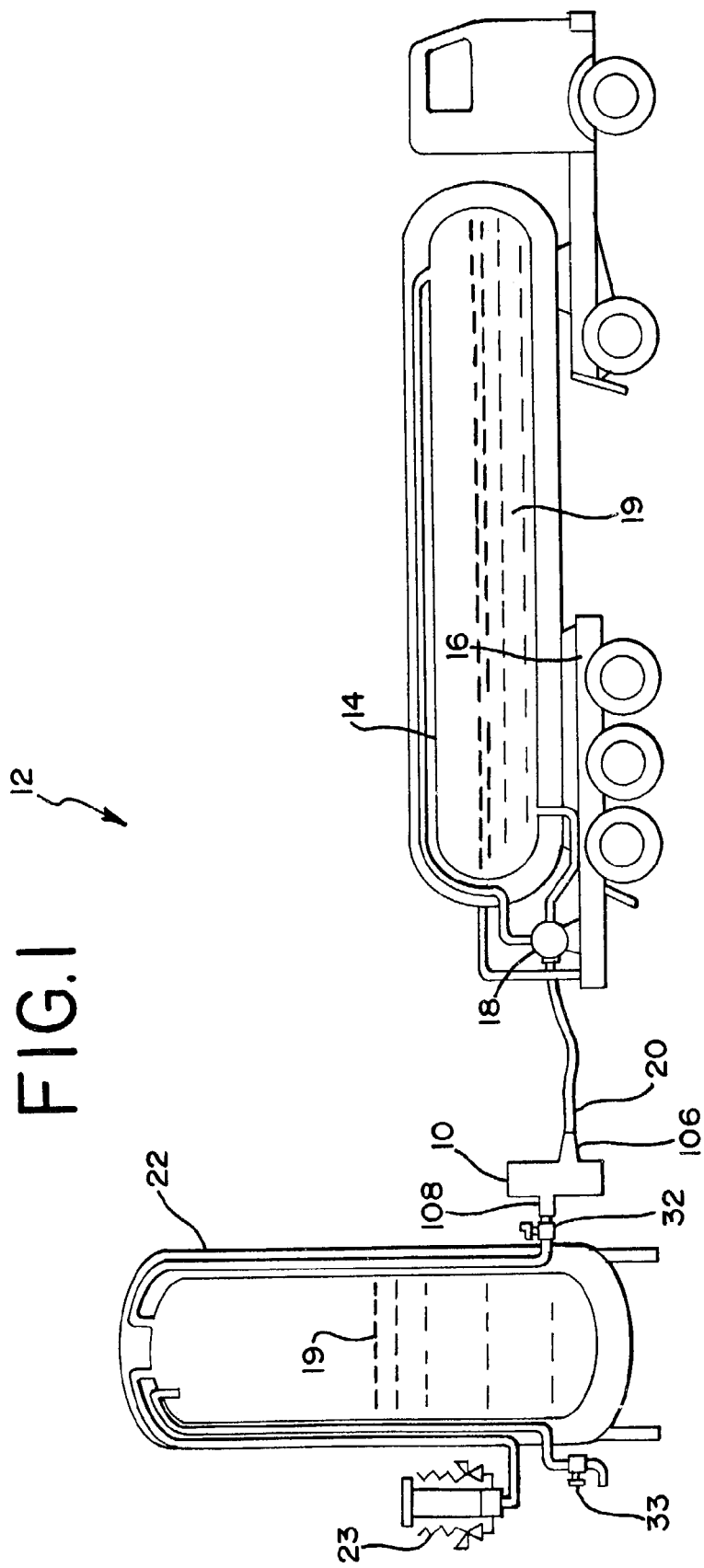
FIG. 1 is a schematic diagram of a pressure vessel equipped with an embodiment of the quick closing shut-off valve of the present invention where the vessel is being filled by a tank truck.

Referring to FIG. 1, an embodiment of the quick closing shut-off valve of the present invention is indicated at 10 and illustrated as installed on the inlet valve 32 of a stationary storage tank 22. A transportable supply tank 14 is positioned upon a truck 16 that also features an inboard, high pressure, high flow rate, centrifugal transport pump 18. The pump 18 runs a substance 19, such as a liquid cryogenic, from the supply tank 14 through a feed or supply line 20, through the quick closing shut-off valve 10 and into a storage tank 22. In addition to the inlet valve 32, the storage tank 22 has relief valves 23 and an outlet valve 33 for dispensing the stored substance. The pump 18 may also be a stationary pump located by the storage tank site 22 rather than inboard the truck 16.

Figure 2:
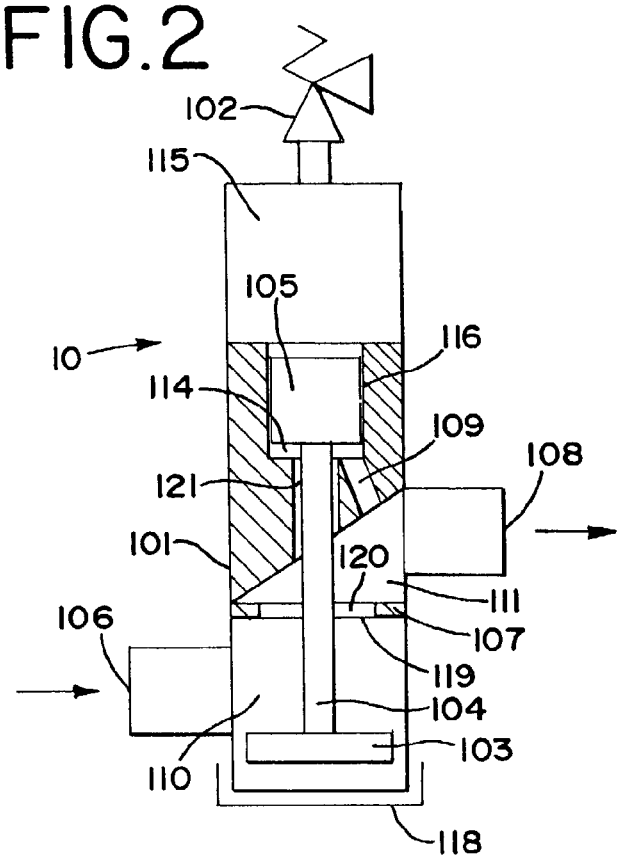
FIG. 2 is an enlarged cross sectional view of the quick closing shut-off valve of FIG. 1 in the open configuration.
Figure 3:
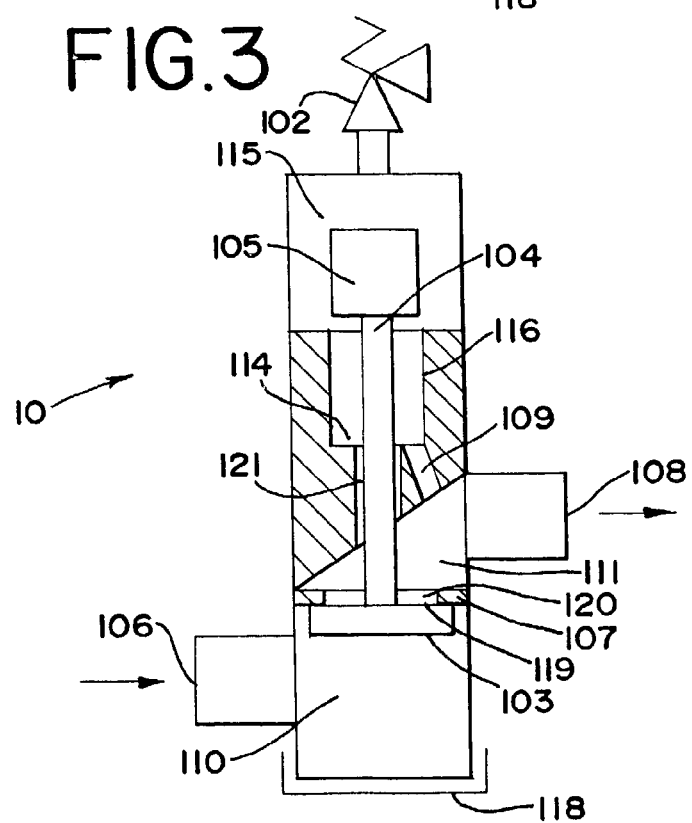
FIG. 3 is an enlarged cross sectional view of the quick closing shut-off valve of FIG. 1 in the closed configuration.

The quick closing shut-off valve illustrated at 10 in FIG. 1, is indicated in general at 10 in FIGS. 2 and 3 in the open and closed configurations, respectively. The quick closing shut-off valve consists of a cylindrical body 101 having an inlet 106 and an outlet 108. With reference to FIG. 1, the inlet 106 is in communication with the feed supply line 20 from the truck 16 and the outlet 108 is in communication with the inlet valve 32 of the storage tank 22.

As illustrated in FIGS. 2 and 3, the inlet 106 of the quick closing valve leads to an inlet chamber 110. The bottom of the inlet chamber 110 is enclosed by an installation lid 118. The sides of the inlet chamber 110 are enclosed by the body 101 of the quick closing valve. The top of the inlet chamber 110 is partially enclosed by a valve seat 107. The valve seat 107 includes an opening 119, which defines a passage 120 therethrough. Thus the valve seat 107 reduces the top of the inlet chamber 110 to the size of the opening 119 in the valve seat 107.

The quick closing valve also includes a closing element 103 which is interconnected to a piston 105 via a pull rod 104. The closing element 103 is shaped as a plate. The closing element 103 may also be formed in a different shape, such as a cone or a ball. The closing element 103 is located within the inlet chamber 110 and the pull rod 104 is positioned within the center of the opening 119 of the valve seat 107.

As previously discussed, an installation lid 118 closes the inlet chamber 110 and the body 101 of the quick closing shut-off valve. The installation lid 118 may be removed to provide easy access to the closing element 103 and the interior of the body 101 of the quick closing valve.

As illustrated in FIG. 2, when the valve is in the open configuration, the piston 105 is primarily positioned within a working chamber 116. The piston is sized such that the piston 105 does not contact the side walls of the chamber 116. In other words, there is some play between the piston 105 and the side walls of chamber 116. Thus, the piston 105 is free to move in a vertical direction with respect to the working chamber 116 and fluid may pass between piston 105 and the side walls of chamber 116.

As illustrated in FIG. 3, the piston 105 rises from the working chamber 116 into an open section 115 which has a larger cross sectional area than working chamber 116. As piston 105 rises, the pull rod 104 and closing element 103 are also raised. The piston 105 is raised until the closing element 103 contacts the valve seat 107. Once the closing element 103 contacts the valve seat 107, the opening 119 at the top of the inlet chamber 110, and thus passage 120, is plugged.

The open section 115 is fitted with a pressure relief device, such as safety valve 102. The safety valve may be replaced by a rupture disc designed to rupture when a maximum permissible pressure is reached.

As illustrated in FIGS. 2 and 3, an outlet chamber 111 is positioned above the passage 120 in the valve seat 107. The outlet chamber 111 is in communication with a channel 109, an annular gap 121 that surrounds the pull rod 104 and the portion 114 of working chamber 116 under the piston 105. The inlet chamber 110 is interconnected to the outlet chamber 111 via passage 120. Thus, the inlet chamber 110 and the outlet chamber 111 of the body 101 are interconnected to the working chamber 116 and the open section 115 of the body 101 by the gap 121, the channel 109 and the spacing between the piston 105 and the side walls of chamber 116. The outlet chamber 111 is also in communication with the valve outlet 108.

In use, with reference to FIG. 1, the feed line 20 from a delivery truck 16 is connected to the inlet 106 of the quick closing valve. A pressurized fluid, such as liquid nitrogen, flows from the delivery truck 16 into the quick closing valve 10 via the feed line 20. As shown in FIG. 2, when the valve is in the open configuration, the pressurized fluid is able to flow in the inlet 106, through the inlet chamber 110, through the passage 120 to the outlet chamber 111 and finally out the outlet 108 to the storage tank 22.

As illustrated in FIG. 2, when the fill process begins, the closing element 103 is positioned below the inlet 106 so that the closing element 103 does not interfere with the flow of the liquid through the valve. As liquid flows through the valve, liquid enters the working chamber 116 through annular gap 121 and channel 9. The play between the piston 105 and the walls of chamber 116 permits liquid, or gas evaporated from the liquid, entering working chamber 116 through annular gap 121 and port 109 to flow around piston 105 and into open section 115. As a result, the pressure under the piston 105 and the pressure above the piston 105 become equalized.

The safety valve 102 that is fitted on the open section 115 is set at a predetermined maximum permissible pressure for the inlet of the storage tank 22 (FIG. 1). As the pressure within the vessel being filled (22 in FIG. 1) increases, the pressure within working chamber 116 and open section 115 increases. If the pressure within the vessel being filled increases to the point that the predetermined maximum pressure value of safety valve 102 is exceeded in open section 115, the safety valve 102 opens so that the pressure above the piston 105 decreases. The resulting difference in the pressure below the piston 105 and the pressure above the piston 105 initiates upward movement of the piston 105. As such, when the pressure within open section 115 is relieved due to the opening of safety valve 120, the piston 105 is raised.

As the piston 105 is raised upward through the working chamber 116 and into the open section 115, the pull rod 104 and the closing element 103 are also raised. As illustrated in FIG. 3, the piston 105 and the pull rod 104 lift the closing element 103 until it contacts the valve seat 107 and closes the passage 120 therein. Once the closing element 103 contacts the valve seat 107, the flow of the fluid into the storage tank (22 in FIG. 1) is shut-off.

Consequently, the pressure under the closing element 103 increases to the value of the pressure of the source while the pressure above the closing element 103 is kept at the level of the pressure setting of the safety valve 102. This pressure differential maintains the closing element 103 and the piston 105 in a raised position thereby maintaining the valve in the closed configuration illustrated in FIG. 3. When the piston 105 enters the open section 115, the area through which the liquid flows around piston 105 increases thereby increasing the flow rate of the liquid from the outlet 108, and consequently from the storage tank 22 through gap 121 and channel 109, working chamber 116, open section 115 and safety valve 102. This increased flow rate keeps the safety valve 102 in a stable open position until the pressure inside the storage tank 22 decreases to a pressure lower than the predetermined maximum pressure value set on the safety valve 102.

The quick closing shut-off valve remains closed as long as the pressure at the valve inlet 106 and in the inlet chamber 110 under the closing element 103 is higher than the pressure in outlet chamber 111 above it or at the predetermined maximum pressure value set on the safety valve 102. If the pressure at the inlet 106 decreases below the predetermined maximum pressure value of safety valve 102, the closing element 103, together with the pull rod 104 and piston 105, begin to fall downwards within the body 101. This permits the flow of liquid through valve 10 to resume. Thus, after the risk of excessive pressure within vessel 22 (FIG. 1) is removed, the quick closing shut-off valve 10 will automatically re-open and the filling process may continue.

The quick closing shut-off valve of the present invention thus provides simplicity of design in that the device features essentially one moving element composed of the closing element 103, pull rod 104 and piston 105. In addition, the actuating element is a standard safety valve or rupture disk. Such simplicity of design results not only in low investment cost, but also high reliability of operation as well.

While various embodiments of the present invention have been described, it should be understood that other modifications, substitutions and alternatives can be made without departing from the spirit and scope of the invention, which should be determined from the appended claims.

What is claimed is:

1. A device for over-pressure protection of a tank during filling with a liquid, comprising:
   a main body with an inlet that leads to an inlet chamber, an outlet that leads to an outlet chamber, and a valve seat having an opening that defines a passage therein, wherein the passage interconnects the inlet chamber to the outlet chamber, said main body also featuring a working chamber and an open section in communication with the working chamber;
   a closing element disposed within said main body and movable between an open position where liquid may flow through the passage and a closed position where the closing element engages the valve seat so that liquid is prevented from flowing through the passage; and
   a piston movably disposed within a working chamber within the main body and connected to the closing element by a pull rod, said working chamber in communication with the outlet chamber so that said piston is adapted to communicate with the tank through the main body outlet so that the closing element is moved between the open and closed positions in response to a pressure change within the tank; and
   said piston sized smaller than said working chamber so that fluid may pass between the piston and sidewalks of the working chamber into the open section.

2. The device of claim 1, wherein the closing element is a plate.

3. The device of claim 1, wherein the closing element is disposed in the inlet chamber and the pull rod passes through the passage of the valve seat.

4. The device of claim 3 wherein the outlet chamber communicates with the working chamber through an annular gap surrounding the pull rod.

5. The device of claim 4 further comprising a pressure relief device in communication with the open section.

6. The device of claim 5 wherein the pressure relief device is a safety valve.

7. The device of claim 5 wherein the pressure relief device is a rupture disk.

8. The device of claim 1 further comprising a channel in communication with the outlet chamber and the working chamber.

9. The device of claim 1 further comprising a pressure relief device in communication with the open section.

10. The device of claim 9 wherein the pressure relief device is a safety valve.

11. The device of claim 9 wherein the pressure relief device is a rupture disk.

12. The device of claim 1, wherein the open section has a larger cross sectional area than the working chamber.

13. The device of claim 12 further comprising a pressure relief device in communication with the open section.

14. The device of claim 13 wherein the pressure relief device is a safety valve.

15. The device of claim 13 wherein the pressure relief device is a rupture disk.

16. A device for protecting a tank from over-pressurization during filling with a liquid from a source comprising:
   a main body having an inlet adapted to communicate with the liquid source, an outlet adapted to communicate with the tank and a passage there between;
   a closing element positioned within the main body and movable between an open position where liquid may pass through the passage and a closed position where the closing element blocks the passage so that liquid is prevented from passing there through;
   a piston movably positioned within a working chamber in the main body, said piston sized smaller than said working chamber so that fluid may pass between the piston and sidewalks of the working chamber;

a pull rod connecting the piston to the closing element;

a pressure relief device in communication with the working chamber above the piston and set to open at a predetermined maximum pressure;

said working chamber in communication with the outlet so that when the predetermined maximum pressure is reached in the tank, the pressure in the working chamber also reaches the predetermined maximum pressure so that the pressure relief device opens and pressure above the piston is reduced so that the piston rises and moves the closing element to the closed position.

17. The device of claim 16 further comprising an open section having a larger cross sectional area than the working chamber and in communication with the working chamber and the pressure relief device.

18. The device of claim 16 wherein the pull rod passes through the passage.

* * * * *